United States Patent
Munemoto et al.

(10) Patent No.: US 9,864,453 B2
(45) Date of Patent: Jan. 9, 2018

(54) METHOD AND APPARATUS FOR IMPROVING ACCURACY OF TOUCH SCREEN EVENT ANALYSIS BY USE OF EDGE CLASSIFICATION

(71) Applicant: QEEXO, CO., San Jose, CA (US)

(72) Inventors: Taihei Munemoto, Pittsburgh, PA (US); Julia Schwarz, Pittsburgh, PA (US); Chris Harrison, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

(21) Appl. No.: 14/492,604

(22) Filed: Sep. 22, 2014

(65) Prior Publication Data

US 2016/0085372 A1  Mar. 24, 2016

(51) Int. Cl.
*G06F 3/041* (2006.01)
*G06F 3/043* (2006.01)

(52) U.S. Cl.
CPC ............ *G06F 3/0416* (2013.01); *G06F 3/043* (2013.01); *G06F 2203/04106* (2013.01)

(58) Field of Classification Search
CPC ...... G06F 3/041; G06F 3/0416; G06F 3/0418; G06F 2203/0381; G06F 2203/04106; G06F 3/043; G06F 3/0433; G06F 3/044; G06F 3/0488; G06F 3/04886; G06F 2203/04803; G06K 9/0002; G06K 9/00087
See application file for complete search history.

(56) References Cited

U.S. PATENT DOCUMENTS 9,013,452 B2  4/2015 Harrison et al.
9,019,244 B2  4/2015 Harrison
(Continued)

FOREIGN PATENT DOCUMENTS

JP  2004-213312 A  7/2004
KR  10-2002-0075283 A  10/2002
(Continued)

OTHER PUBLICATIONS

Non-Final Office Action—dated Jun. 24, 2014—U.S. Appl. No. 13/849,698, filed Mar. 23, 2013, titled: "Method and System for Activating Different Interactive Functions Using Different Types of Finger Contacts."
(Continued)

*Primary Examiner* — Keith Crawley
(74) *Attorney, Agent, or Firm* — IPV Law Group; David N. Tran (57) ABSTRACT

Methods and apparatus of embodiments of the present invention include a classification system configured to treat edge contact of a touch screen as a separate class of touch events such that any touches occurring near the edge of the touch screen are to be processed by a classifier that is configured to process edge contacts as compared to a classifier that is configured to process other contacts that may occur in the approximate middle of the touch screen which may be wholly digitized. An apparatus may employ two separate and distinct classifiers, including a full touch classifier and an edge touch classifier. The touch screen may be configured to have two different sensing regions to determine which of the two classifiers is appropriate for a touch event.

15 Claims, 4 Drawing Sheets

(56) References Cited

U.S. PATENT DOCUMENTS

| | | | |
|---|---|---|---|
| 9,329,688 B2 | 5/2016 | Harrison | |
| 9,329,715 B2 | 5/2016 | Schwarz et al. | |
| 9,612,689 B2 | 4/2017 | Harrison et al. | |
| 2005/0083313 A1 | 4/2005 | Hardie-Bick et al. | |
| 2008/0319932 A1* | 12/2008 | Yih | G06K 9/6256 706/20 |
| 2009/0174679 A1* | 7/2009 | Westerman | G06F 3/03547 345/173 |
| 2011/0018825 A1 | 1/2011 | Kondo et al. | |
| 2011/0248948 A1* | 10/2011 | Griffin | G06F 3/041 345/174 |
| 2012/0158629 A1* | 6/2012 | Hinckley | G06F 3/038 706/15 |
| 2013/0234982 A1* | 9/2013 | Kang | G06F 3/0488 345/174 |
| 2014/0071095 A1* | 3/2014 | Godsill | G06F 3/0418 345/177 |
| 2014/0210788 A1 | 7/2014 | Harrison et al. | |
| 2014/0240295 A1 | 8/2014 | Harrison | |
| 2014/0289659 A1 | 9/2014 | Harrison et al. | |
| 2014/0300559 A1* | 10/2014 | Tanimoto | G06F 3/0416 345/173 |
| 2014/0327626 A1 | 11/2014 | Harrison et al. | |
| 2014/0368436 A1* | 12/2014 | Abzarian | G06F 3/0488 345/168 |
| 2015/0002405 A1* | 1/2015 | Kuan | G06F 3/041 345/173 |
| 2015/0035759 A1 | 2/2015 | Harrison et al. | |
| 2015/0242009 A1 | 8/2015 | Xiao et al. | |
| 2016/0012348 A1* | 1/2016 | Johnson | G06N 5/027 706/12 |
| 2016/0062545 A1* | 3/2016 | Lai | G06F 3/04886 345/174 |
| 2016/0077615 A1 | 3/2016 | Schwarz et al. | |
| 2016/0077650 A1* | 3/2016 | Durojaiye | G06F 3/041 345/173 |
| 2016/0077664 A1 | 3/2016 | Harrison et al. | |
| 2016/0085324 A1 | 3/2016 | Schwarz et al. | |
| 2016/0085333 A1 | 3/2016 | Christopher | |
| 2016/0098185 A1 | 4/2016 | Xiao et al. | |
| 2016/0224145 A1 | 8/2016 | Harrison et al. | |
| 2017/0024892 A1 | 1/2017 | Harrison et al. | |
| 2017/0060279 A1 | 3/2017 | Harrison | |

FOREIGN PATENT DOCUMENTS

| | | | | |
|---|---|---|---|---|
| WO | 2006-070044 A1 | | 7/2006 | |
| WO | WO2013/059488 | * | 4/2013 | G06F 3/041 |

OTHER PUBLICATIONS

Non-Final Office Action—dated Oct. 16, 2014—U.S. Appl. No. 13/780,494, filed Feb. 28, 2013, titled: "Input Tools Having Viobro-Acoustically Distinct Regions and Computing Device for Use With the Same."

U.S. Appl. No. 13/958,427, filed Aug. 2, 2013, titled: "Capture of Vibro-Acoustic Data Used to Touch Types."

U.S. Appl. No. 14/191,329, filed Feb. 26, 2014, titled: "Using Capacitive Images for Touch Type Classification."

U.S. Appl. No. 13/887,711, filed May 6, 2013, titled: "Using Finger Touch Types to Interact with Electronic Devices."

U.S. Appl. No. 14/483,150, filed Sep. 11, 2014, titled: "Method and Apparatus for Differentiating Touch Screen Users Based on Touch Event Analysis."

U.S. Appl. No. 14/495,041, filed Sep. 24, 2014, titled: "Method for Improving Accuracy of Touch Screen Event Analysis by Use of Spatiotemporal Touch Patterns."

U.S. Appl. No. 14/242,127, filed Apr. 1, 2014, titled: "Method and Apparatus for Classifying Touch Events on a Touch Sensitive Surface."

International Search Report and Written Opinion received for PCT Application No. PCT/US2014/049485 dated Nov. 17, 2014, 13 pages.

International Search Report and Written Opinion received for PCT Application No. PCT/US2014/34977 dated Sep. 18, 2014, 12 pages.

International Search Report and Written Opinion received for PCT Application No. PCT/US2012/060865 dated Mar. 29, 2013, 10 pages.

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

Benko, Hrvoje, Wilson, Andrew, Balakrishnan, Ravin; Sphere: Multi-Touch Interactions on a Spherical Display; Proceedings of UIST, 2008; pp. 77-86; 2008.

Burges, Christopher; A Tutorial on Support Vector Machines for Pattern Recognition; Data Mining and Knowledge Discovery, 2; pp. 121-167; 1998.

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (Tabletop); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.

Dietz, Paul, Leigh, Darren; DiamondTouch: A Multi-User Touch Technology; ACM Symposium on User Interface Software & Technology (UIST); pp. 219-226; 2001.

Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.

Harrison, Chris, Tan, Desney, Morris, Dan; Skinput: Appropriating the Body as an Input Surface; Proceedings of CHI, 2010; pp. 453-462; 2010.

Harrison, Chris, Hudson, Scott; Scratch Input: Creating Large, Inexpensive, Unpowered and Mobile Finger Input Surfaces; Proceedings of UIST, 2008; pp. 205-208; 2008.

Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen + Touch = New Tools; Proceedings of UIST, 2010; pp. 27-36; 2010.

Hinckley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; The Generalized Perceived Input Point Model and How to Double Touch Accuracy by Extracting Fingerprints; Proceedings of CHI, 2010; pp. 581-590; 2010.

Kaltenbrunner, Martin, Bencina, Ross; reacTIVision: A Computer-Vision Framework for Table-Based Tangible Interaction; Proceedings of TEI, 2007; pp. 69-74; 2007.

Matsushita, Nobuyuki, Rekimoto, Jun; HoloWall: Designing a Finger, Hand, Body, and Object Sensitive Wall; Proceedings of UIST, 1997; pp. 209-210; 1997.

Mimio; http://www.mimio.com.

Olwal, Alex, Wilson, Andrew; SurfaceFusion: Unobtrusive Tracking of Everyday Objects in Tangible User Interfaces; Proceedings of GI, 2008; pp. 235-242; 2008.

(56) References Cited

OTHER PUBLICATIONS

Paradiso, Joseph, Leo, Che King; Tracking and Characterizing Knocks Atop Large Interactive Displays; Sensor Review, 25(2); pp. 134-143; 2005.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120; 2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.
International Search Report and Written Opinion for PCT/US2012/060865; dated Mar. 29, 2013.
Non-Final Office Action—dated Mar. 13, 2015—U.S. Appl. No. 13/958,427, filed Mar. 23, 2013, titled: "Capture of Vibro-Acoustic Data Used to Determine Touch Types".
Final Office Action—dated Jun. 19, 2015—U.S. Appl. No. 13/958,427, filed Mar. 23, 2013, titled: "Capture of Vibro-Acoustic Data Used to Determine Touch Types".
Non-Final Office Action—dated Apr. 6, 2015—U.S. Appl. No. 13/887,711, filed May 6, 2013, title: "Using Finger Touch Types to Interact With Electronic Devices".
Final Office Action—dated Aug. 7, 2015—U.S. Appl. No. 14/191,329, filed Feb. 26, 2014, titled: "Using Capacitive Images for Touch Type Classification".
Non-Final Office Action—dated Oct. 1, 2015—U.S. Appl. No. 14/503,894, filed Dec. 30, 2015, titled: "Method and Apparatus for Addressing Touch Discontinuities".
International Search Report and Written Opinion received for PCT Application No. PCT/US2014/049485 dated Nov. 17, 2014.
International Search Report and Written Opinion received for PCT Application No. PCT/US2014/033380 dated Mar. 13, 2015.
International Search Report and Written Opinion received for PCT Application No. PCT/US2014/034977 dated Sep. 18, 2014.
Non-Final Office Action—dated Oct. 7, 2015—U.S. Appl. No. 14/495,041, filed Sep. 24, 2014, titled: "Method for Improving Accuracy of Touch Screen Event Analysis by Use of Spatiotemporal Touch Patterns".
Non-Final Office Action—dated Oct. 2, 2015—U.S. Appl. No. 14/486,800, filed Sep. 15, 2014, titled: "Method and Apparatus for Resolving Touch Screen Ambiguities".
Non-Final Office Action—dated Dec. 18, 2015—U.S. Appl. No. 14/483,150, filed Sep. 11, 2014, titled: "Method and Apparatus for Differentiating Touch Screen Users Based on Touch Event Analysis".
International Search Report and Written Opinion received for PCT Application No. PCT/US2015/051355 dated Dec. 15, 2015.
International Search Report and Written Opinion received for PCT Application No. PCT/US2015/050570 dated Dec. 17, 2015.
International Search Report and Written Opinion received for PCT Application No. PCT/US2015/047428 dated Nov. 27, 2015.
International Search Report and Written Opinion received for PCT Application No. PCT/US2015/014581 dated May 14, 2015.
Non-Final Office Action—dated May 31, 2017—U.S. Appl. No. 14/612,089, filed Feb. 2, 2015, titled: "Method and System for Activating Different Interactive Functions Using Different Types of Finger Contacts."
Final Office Action—dated Dec. 20, 2016—U.S. Appl. No. 15/073,407, filed Mar. 17, 2016, titled: "Input Tools Having Viobro-Acoustically Distinct Regions and Computing Device for Use With the Same."
Non-Final Office Action—dated Nov. 10, 2016—U.S. Appl. No. 13/958,427, filed Aug. 2, 2013, titled: "Capture of Vibro-Acoustic Data Used to Determine Touch Types."
Final Office Action—dated Aug. 26, 2016—U.S. Appl. No. 14/219,919, filed Mar. 19, 2014, titled: "Method and Device for Sensing Touch Input."
Non-Final Office Action—dated Feb. 2, 2017—U.S. Appl. No. 14/191,329, filed Feb. 26, 2014, titled: "Using Capacitive Images for Touch Type Classification."
Final Office Action—dated Jun. 8, 2017—U.S. Appl. No. 13/887,711, filed May 6, 2013, titled: "Using Finger Touch Types to Interact With Electronic Devices."
Non-Final Office Action—dated Apr. 21, 2017—U.S. Appl. No. 15/075,648, filed Mar. 21, 2016, titled: "Method and Apparatus for Differentiating Touch Screen Users Based on Touch Event Analysis."
Non-Final Office Action—dated Dec. 1, 2016—U.S. Appl. No. 14/486,800, filed Sep. 15, 2014, titled: "Method and Apparatus for Resolving Touch Screen Ambiguities."
Non-Final Office Action—dated Nov. 25, 2016—U.S. Appl. No. 14/495,041, filed Sep. 24, 2014, titled: "Imethod for Improving Accuracy of Touch Screen Event Analysis by Use of Spatiotemporal Touch Patterns."
Non-Final Office Action—dated May 16, 2017—U.S. Appl. No. 14/503,894, filed Oct. 1, 2014, titled: "Method and Apparatus for Addressing Touch Discontinuities."
Final Office Action—dated Jan. 18, 2017—U.S. Appl. No. 14/684,407, filed Apr. 12, 2015, titled: "Method and Apparatus for Classifying Contacts With a Touch Sensitive Device."
Final Office Action—dated May 1, 2017—U.S. Appl. No. 14/834,434, filed Aug. 24, 2015, titled: "Touch Sensitive DeviceWith Multi-Sensor Stream Synchronized Data."
Non-Final Office Action—dated Jun. 13, 2016—U.S. Appl. No. 14/751,589, filed Jun. 26, 2015, titled: "Method and Apparatus for Classifying a Touch Event on a Touch Screen as Related to One of Multiple Function Generating Interaction Layers and Activating a Function in the Selected Interaction Layer."
International Search Report and Written Opinion for PCT/US2016/044552; dated Oct. 17, 2016.
International Search Report and Written Opinion for PCT/US2016/040194; dated Sep. 19, 2016.
International Search Report and Written Opinion for PCT/US2015/051582; dated Feb. 26, 2016.
International Search Report and Written Opinion for PCT/US2015/051106; dated Jan. 28, 2016.
International Search Report and Written Opinion for PCT/US2015/047616; dated Jul. 1, 2016.
European Patent Office Extended Search Report for EP 14 83 2247; dated Feb. 23, 2017.
European Patent Office Extended Search Report for EP 14 79 4212; dated Nov. 9, 2016.
International Search Report and Written Opinion for PCT/US2015/050570; dated Dec. 17, 2015.
International Search Report and Written Opinion for PCT/US2015/05135; dated Dec. 15, 2015.

\* cited by examiner

METHOD AND APPARATUS FOR IMPROVING ACCURACY OF TOUCH SCREEN EVENT ANALYSIS BY USE OF EDGE CLASSIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to the addition of an edge touch classifier to increase the accuracy of the analysis of touch screen events.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various electronic devices today are typically operated by a user interacting with a touch sensitive screen. This feature is particularly a characteristic of the recent generation of smart phones. Typically, the touch sensitive screens respond to finger contact to activate the display for further processes. Contact may also be made using tools such as a stylus or other parts of the hands. The fingers and other contacts made to the touch sensitive screen generally appear as an activated point or blob (i.e., region). However, when touch contacts occur on the edge of the touch screen, only a portion of the touch contact can be digitized.

The touch sensitive screen may be associated with a classification engine which is normally trained on real world touch event data from users. However, because edge contacts are rare in ordinary use, classifiers (in the classification engine) receive few edge training instances. In response, the classification accuracy of edge touch events tends to be lower. Further, because less of the touch contact is visible, there is less data to work with. This leads to several problems, most notably that classification algorithms may over-fit to the limited data. Secondly, edge contacts appear very different to full-contact, ordinary touches, leading to bi-modal (or even multi-modal) distributions of key characteristics to which some classification algorithms are ill-suited to accommodate. There is therefore a need to mitigate the potential problems associated with edge touch events that could otherwise reduce the accuracy of such classification analysis.

BRIEF SUMMARY

For some embodiments, an apparatus for improving accuracy of touch screen event analysis comprises two separate and distinct classifiers including a full touch classifier and an edge touch classifier. In order to determine which such classifier is appropriate for each touch event, the touch screen is provided with two similarly distinct sensing regions. One such sensing region is derived from the conventional touch screen and is generally the bulk of the central area of the touch screen, but somewhat reduced in size relative to the entire physical extent of the touch screen. The balance of the touch screen around the periphery, forms the second sensing region which is everywhere proximate to the screen edge. The precise shape and size of this edge touch sensing region is chosen to enable a high probability that any finger touch that might extend beyond the edge of the touch screen would be treated as an edge touch event which will instigate edge touch classifier operation instead of full touch classifier operation during the ensuing analysis of the event.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIG. 2 comprising

FIG. 3, comprising

DETAILED DESCRIPTION

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

The aforementioned issues that arise from a user contacting the edges of touch screens are addressed in embodiments of the present invention by employing a classification system that treats edge contacts as a separate and distinct class of touch events. Touches occurring near the edge of the screen are processed by a classifier that is better suited to process edge contacts (e.g., it has been trained on edge contacts). On the other hand, touches that occur in the middle of the screen (and thus are wholly digitized) are processed by another classifier.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include apparatus for improving accuracy of touch screen event analysis and may comprise two separate and distinct classifiers. A first classifier may be a full touch classifier. A second classifier may be an edge touch classifier. In order to determine which of the first or second classifier is appropriate for a touch event, the touch screen is provided with two similarly distinct sensing regions. One such sensing region is derived from the conventional touch screen and is generally the bulk of the central area of the touch screen, but somewhat reduced in size relative to the entire physical extent of the touch screen. The balance of the touch screen around the periphery, forms the second sensing region which is everywhere proximate to the screen edge. The precise shape and size of this edge touch sensing region is chosen to enable a high probability that any finger touch that might extend beyond the edge of the touch screen would be treated as an edge touch event which will instigate edge touch classifier operation instead of full touch classifier operation during the ensuing analysis of the event.

The disclosed embodiments may include a method for improving accuracy of touch screen event analysis and may comprise detecting a touch event on a touch sensitive screen, said surface having at least two touch regions; generating a vibro-acoustic waveform signal using at least one sensor detecting such touch event; converting the waveform signal into at least one other form; extracting distinguishing features from said converted waveform signal; and classifying said features to analyze the features of the converted touch event waveform signal by employing one of at least two different classification processes depending on which of the two distinct touch regions was touched during the touch event.

The disclosed embodiments may include a machine-readable medium carrying one or more sequences of instructions for providing social information, which instructions, when executed by one or more processors, cause the one or more processors to detect a touch event on a touch sensitive screen, said surface having at least two touch regions, generate a vibro-acoustic waveform signal using at least one sensor detecting such touch event, convert the waveform signal into at least one other form, extract distinguishing features from said converted waveform signal, and classify said features to analyze the features of the converted touch event waveform signal by employing one of at least two different classification processes depending on which of the two distinct touch regions was touched during the touch event.

In general, a user may make contact with a touch sensitive screen of a touch sensitive device or computer system using a stylus or other parts of the hands such as the palm and various parts of the finger, i.e., pad, nail, knuckle, etc. Each such different type of touch mechanism produces a different type of digital signature. Moreover, each user of a touch sensitive device may have his or her own unique touch event characteristics resulting from anatomical differences such as fleshiness, finger size, finger shape, BMI and the like. These differences in touch event characteristics, whether the result of different user anatomies or different touch mechanisms, may be used advantageously to improve the touch screen technology by reducing ambiguities, distinguishing between users, responding only to intentional touch events and the like. Such advantageous uses are derived from sophisticated sensor-based analysis of the touch event coupled with one or more algorithms designed to provide further analytical characteristics otherwise hidden or not readily apparent in the data generated by the touch event.

By way of example, one such apparatus is disclosed in pending U.S. patent application Ser. No. 14/483,150 filed on Sep. 11, 2014 by the Applicant hereof and entitled "Method And Apparatus For Differentiating Touch Screen Users Based On Touch Event Analysis". This co-pending application discloses that when a user touches a touch screen a mechanical force is applied to the screen resulting in mechanical vibrations that may be captured by a variety of sensors such as impact sensors, vibration sensors, accelerometers, strain gauges or acoustic sensors such as a microphone.

Once the vibro-acoustic signal has been captured, it can be converted into a series of features, for example: Average acoustic power, Standard Deviation, Variance, Skewness, Kurtosis, Absolute sum, Root Mean Square (RMS), Dispersion, Zero-crossings, Spectral centroid, Spectral density, Linear Prediction-based Cepstral Coefficients (LPCC), Perceptual Linear Prediction (PLP), Cepstral Coefficients Cepstrum Coefficients, Mel-Frequency Cepstral Coefficients (MFCC), Frequency phases (e.g., as generated by an FFT).

Simultaneously, many touch screen technologies are able to digitize several aspects of a touch event, such as the shape, size, capacitance, orientation, pressure, etc. The latter may be used as distinguishing features, or such features can be derived from them.

Because human fingers vary in their anatomical composition, their acoustic and touch properties can vary between humans. Moreover, the way users touch a screen can also be distinguishing (e.g., what finger, what part of the finger, how flat, how hard). Thus, the vibro-acoustic features and touch features contain properties that can be characteristic of different users and different parts of user's hands (e.g., fingertip, knuckle, and nail).

It is thus possible to provide a classifier that can run on a touch computing device that upon receipt of a touch event, makes a guess about which user is operating the device, or whether the user is authorized or has any personalized features. Alternatively, it is also possible to provide a classifier that can run on a touch computing device that upon receipt of a touch event, makes a guess about what part of the finger was used to contact the screen.

For some embodiments, the disclosed method may include the following operations and may employ the following components:

(a) a sensing system that may be configured to continuously sample vibro-acoustic data, saving it into a buffer. This buffer can be of many lengths such as, for example 50 milliseconds;

(b) a touch sensitive screen may be configured wait for a touch event to occur. Any number of touch technologies may be possible. The operations of the touch sensitive screen may be configured to operate in parallel with the sensing system;

(c) when the touch sensitive screen detects a touch event, it may be configured to trigger a conversion, feature extraction, and classification process;

(d) the data from the vibro-acoustic buffer is retrieved. Because the touch screens typically have some latency, it may be necessary to look backwards in the buffer to find the vibro-acoustic waveform that corresponds to the touch impact (e.g., if the touch screen has a 20 ms latency, it may be necessary to look back in the buffer 20 ms to find the corresponding vibro-acoustic event). All or part of the buffer may be saved and passed to the next operations;

(e) conversion operations may be performed next. The waveform from the sensor is a time-domain representation of the vibro-acoustic signal. In addition to saving the waveform, the signal is converted into other forms. This includes filtering the waveform and transforming into other forms, including frequency domain representations;

(f) feature extraction operations may be performed next, where touch screen controller data and vibro-acoustic data are analyzed to extract features that characterize different users. For the vibro-acoustic data, features are computed for all representations of the signal;

(g) these features are then passed to a classification unit, which uses the information to label the touch event with a user (in addition to whatever the touch sensitive screen reports, e.g., X/Y position, major/minor axes, pressure, etc.);

(h) the augmented touch event is then passed to the OS or end user applications, to associate a use based on the touch event.

For some embodiments, a classifier may be configured to use one or more of the following features to perform its operations: location of touch contact (2D, or 3D in the case of curved glass or other non-planar geometry), size of touch contact (some touch technologies provide an ellipse of the touch contact with major and minor axes), rotation of the touch contact, surface area of the touch contact (e.g., in squared mm or pixels), pressure of touch (available on some touch systems), shear of touch ("shear stress", also called "tangential force" in the literature, arises from a force vector perpendicular to the surface normal of a touch screen. This is similar to normal stress—what is commonly called pressure—which arises from a force vector parallel to the surface normal."), number of touch contacts, capacitance of touch (if using a capacitive touch screen), swept frequency capacitance of touch (if using a swept frequency6 capacitive touch screen), and swept frequency impedance of touch (if using a swept frequency capacitive touch screen). The computation phase may also compute the derivative of the above features over a short period of time, for example, touch velocity and pressure velocity. Other features that the classifier may also use include shape of touch (some touch technologies can provide the actual shape of the touch, and not just a circle or ellipse), and image of the hand pose (as imaged by e.g., an optical sensor, diffuse illuminated surface with camera, near-range capacitive sensing).

The classification engine may use any number of approaches, including but not limited to basic heuristics, decision trees, Support Vector Machine, Random Forest, Naïve bayes, elastic matching, dynamic time warping, template matching, k-means clustering, K-nearest neighbors algorithm, neural network, Multilayer perceptron, multinomial logistic regression, Gaussian mixture models, and AdaBoost. Additionally, the results from several different classifiers may be combined through, for example, a voting scheme.

For some embodiments, it may be possible to use different classifiers based on one or more features. For example, two classifiers could be employed, one for processing sensor waveforms with a high Standard Deviation, and another classifier for waveforms with low Standard Deviation.

Figure 1:
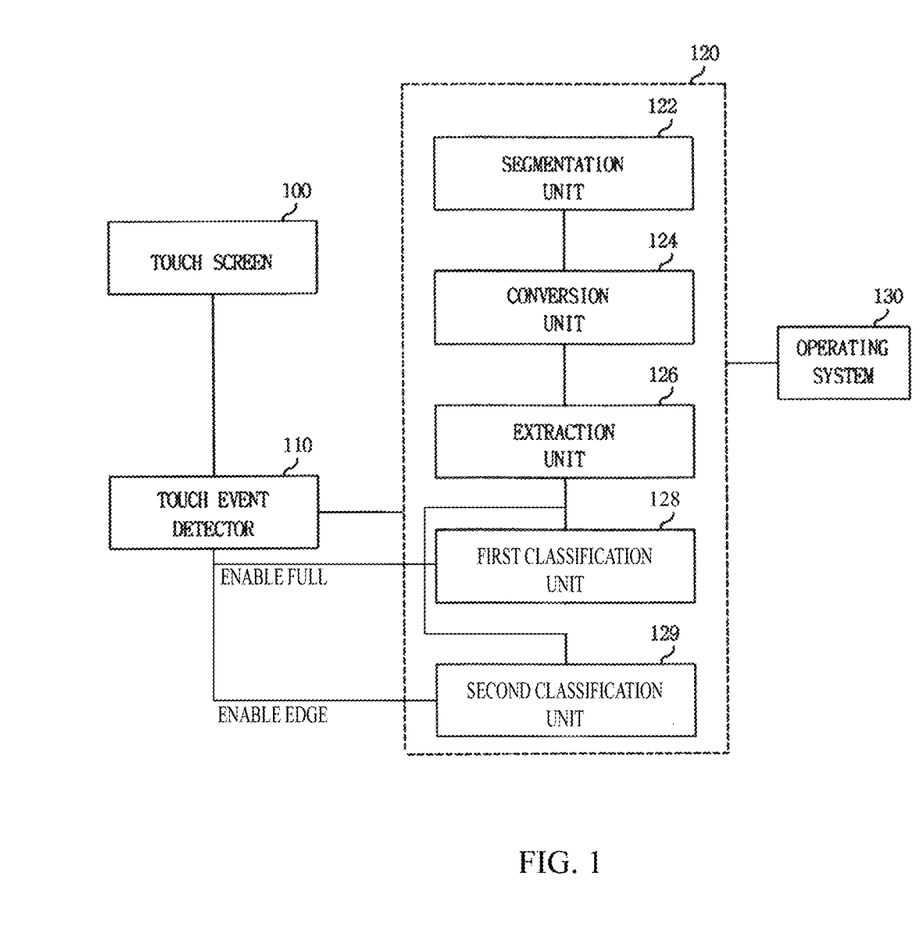
FIG. 1 is a block diagram of a computing system for analyzing a touch screen event and including two separate and distinct classifiers, one for full touch events and one for edge touch events.

FIG. 1 is a block diagram of an example computing system for analyzing a touch event based on use of one of two different classifications of resulting signals in accordance with an embodiment of the present invention. The computing system of the embodiment may have an operating (OS), and can run various types of services or applications, known as apps. The computing system may also be equipped with a telecommunication capability that can allow connections to a communications network. Such a computing system may include, but not be limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 1, the computing system includes a touch screen 100, a touch event detector 110, a classifier 120 and an OS 130. The touch screen 100 is an electronic visual display and serves also as an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, including the conventional tip of the finger, causes the OS 130 to activate the application or service related to the interactive elements appropriate to the identified user. Fingers are diverse appendages, both in their motor capabilities and their anatomical compositions. A single digit contains different parts such as one or more knuckles, a tip, pad and fingernail.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when one or more fingers touch or contact the surface of the touch screen 100, vibro-acoustic responses are produced. The vibro-acoustic characteristics of the respective user fingers and their respective unique anatomical characteristics produce unique responses for each user.

Referring back to FIG. 1, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone a piezoelectric microphone, MEMS microphone and the like. Once the vibro-acoustic signal has been captured by the touch event detector 110, the vibro-acoustic classifier 120 processes the vibro-acoustic signal to analyze the touch event that activated the touch screen.

The OS 130 runs the computing system so that the function can be activated in line with the classification of the vibro-acoustic signals and the corresponding user. The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 to derive a series of features from the electrical signal; and two classification units 128 and 129 to classify each user using the above-described features to analyze the touch event depending upon whether it was a full screen touch event or an edge touch event as will be further described below.

The segmentation unit 122 samples the vibro-acoustic signal, for example, at a sampling rate of 96 kHz, using a sliding window of 4096 samples of the vibro-acoustic signal. The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further down-sample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform. The classification units 128 and 129 classify the vibro-acoustic signal using the features to for example distinguish what user generated the touch event, so that the computing system may selectively activate a function related to the identified user depending on the classified vibro-acoustic signals.

Figure 2A:
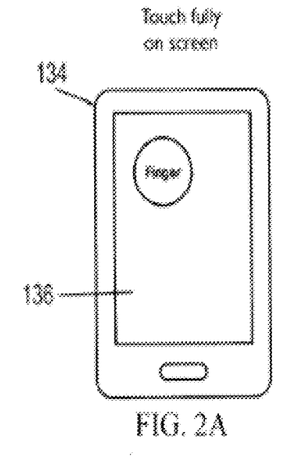
FIGS. 2A through 2D, illustrates four different examples of touch events on a touch screen.
Figure 2B:
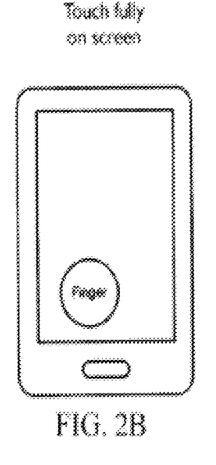
Figure 2C:
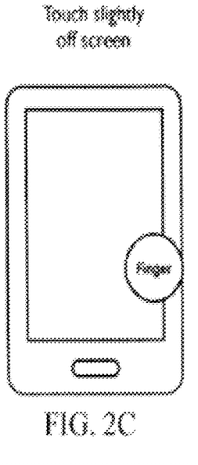
Figure 2D:
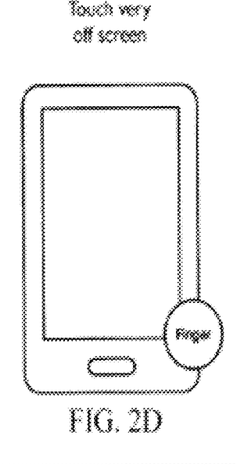
Figure 3A:
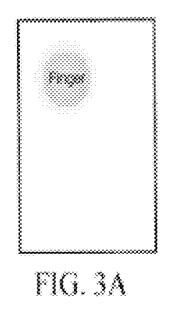
FIGS. 3A through 3D, illustrates what the touch screen "sees" as a result of the corresponding touch events of FIGS. 2A through 2D.
Figure 3B:
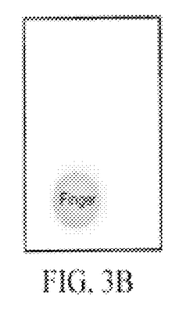
Figure 3C:
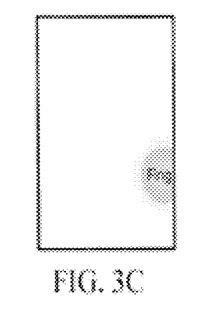
Figure 3D:
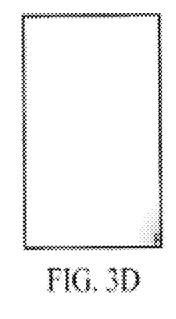

Referring to FIGS. 2A through 2D, it will be seen that a device 134 (i.e., a smart phone) has a touch screen 136. FIGS. 2A and 2B illustrate two examples of touch events that are fully on screen 136. FIGS. 2C and 2D illustrate two further examples of touch events that are partially off the edge of screen 136. FIGS. 3A through 3D illustrate what the touch screen "sees" as a result of the touch events of FIGS. 2A to 2D. As shown in FIGS. 3A and 3B, fully on screen touch events of FIGS. 2A and 2B, result in fully configured touch events which, in the embodiment of FIG. 1, are classified by the first classifier 128. However, as shown in FIGS. 3C and 3D, touch events which are partially off the edge of the screen 136 as depicted in FIGS. 2C and 2D, are "seen" as partially configured edge touch events which, in the embodiment of FIG. 1, are classified by the second classifier 129.

Figure 4:
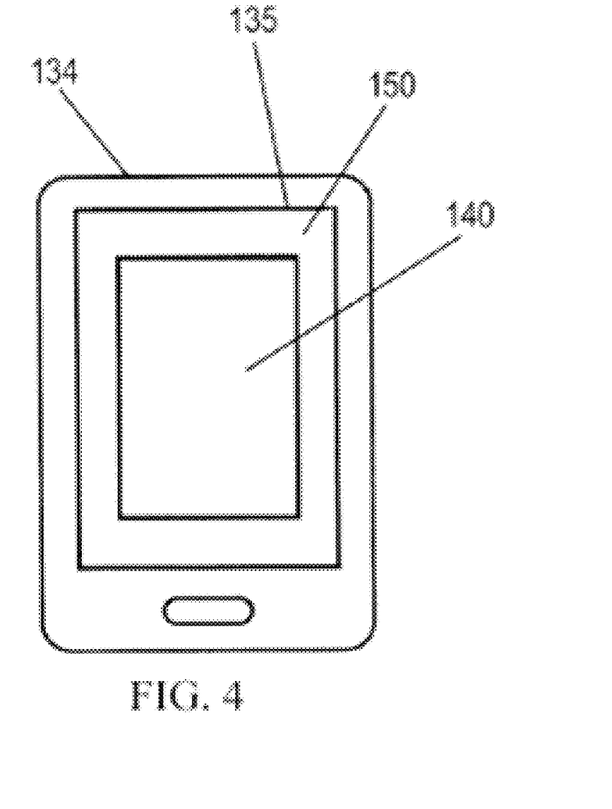
FIG. 4 is an illustration of an exemplary touch screen having distinct touch screen regions in accordance with one embodiment.

One way of determining whether to enable the first classifier 128 or instead to enable the second classifier 129 for each touch event, is illustrated in FIG. 4. In FIG. 4, a device 134 having a modified touch screen 135 is illustrated. The modification consists of dividing the touch screen into two regions 140 and 150. Region 140 is a full touch classification region and region 150 is an edge touch classification region. In the illustrative embodiment if the touch event is entirely within full touch region 140, only the first classification unit 128 is enabled. However, if any portion of the touch event is within edge touch region 150, only the second classification unit 129 is enabled. Alternatively, the centroid (i.e., weighted center) of the touch contact can be used to decide what classifier is triggered. The full touch first classification unit 128 is "trained" to analyze full touch events. However, the edge touch second classification unit 129 is "trained" to analyze edge touch events. In this manner, classification of touch screen events has a significant probability of being more accurate than in those systems that utilize only one classification unit for all touch events including edge touch events as depicted herein.

To aid classification, the user can provide supplemental training samples to the vibro-acoustic classifier 120. In one exemplary embodiment, the classification units 128 and 129 may be implemented with a support vector machine (SVM) for feature classification. The SVM is a supervised learning model with associated learning algorithms that analyze data and recognize patterns, used for classification and regression analysis.

Figure 5:
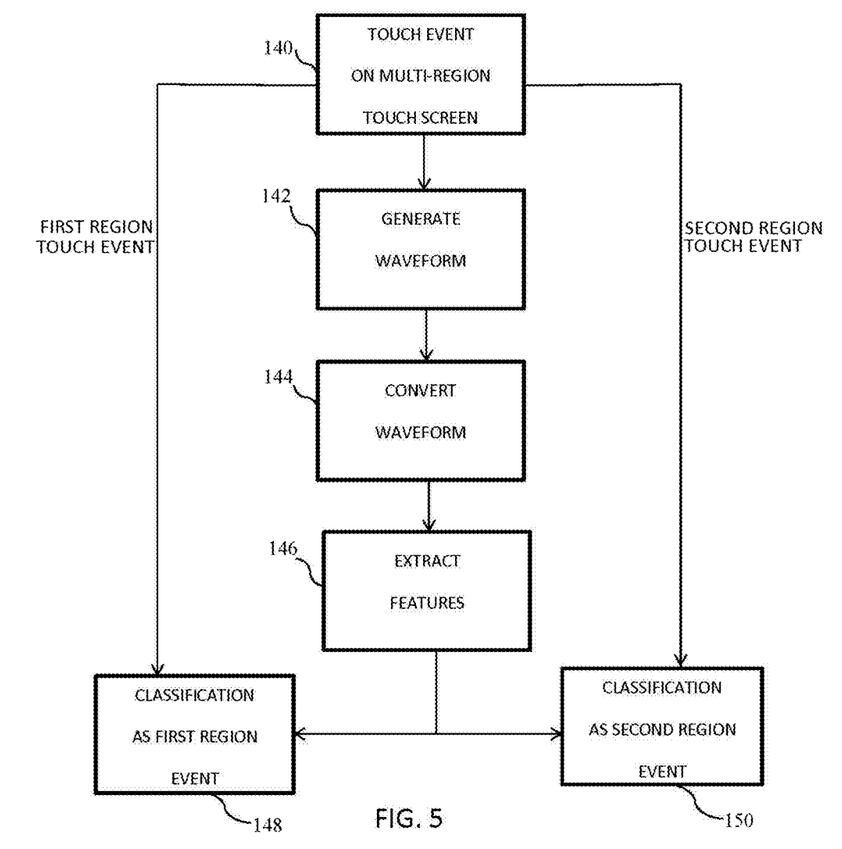
FIG. 5 is a flow chart drawing of an embodiment of the method of the invention.

FIG. 5 illustrates the process steps of an exemplary embodiment of the invention. As shown therein, in step 140 a touch event is detected on a multi-region touch screen. This results in generation of a waveform in step 142. The waveform is converted in step 144 and features are extracted in step 146. Then classification of the extracted features occurs in either step 148 or step 150 depending upon whether the touch event occurred in a first or second region.

Thus it will be understood that what has been disclosed herein are an apparatus and method for differentiating between full touch events and edge touch events in a touch sensitive device. At least one sensor may be employed to detect and capture a waveform signal or acoustical or mechanical effect resulting from a touch event. The waveform signal is converted, and distinguishing features are extracted for use in two distinct classification units to associate such features with the user. A full touch event classifier is trained for such full events, while an edge touch event classifier is trained for analyzing only edge touch events. The appropriate classifier is enabled by a touch screen having two distinct regions, full and edge and in response to the location of the touch event relative to these two regions.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. An apparatus for analyzing touch screen users based on characterization of features derived from a touch event the apparatus comprising:
   a touch sensitive screen for detecting a touch event from at least one user, said touch sensitive screen having two touch regions;
   at least one sensor generating a vibro-acoustic waveform signal from the touch event;
   a converter for converting the waveform signal into a domain signal;
   a feature extractor for extracting distinguishing features from said domain signal; and
   a plurality of classification units which use the distinguishing features of said extractor to analyze the features of the domain signal, a first classification unit configured to classify touch events occurring within a first touch region and a second classification unit configured to classify touch events occurring within a second touch region and not configured to classify touch events occurring within the first touch region, wherein the first touch region is distinct from the second touch region, wherein the first touch region is everywhere proximate to an edge of said touch sensitive screen, wherein the second touch region is all remaining area of said touch sensitive screen not including the first touch region, and wherein if any portion of the touch event is in the first touch region, the first classification unit is configured to classify that event.

2. The apparatus recited in claim 1 wherein said first classification unit is associated with an edge region of said touch sensitive screen.

3. The apparatus recited in claim 1 wherein said second classification unit is associated with a central region of said touch sensitive screen.

4. The apparatus recited in claim 1 wherein said touch sensitive screen comprises an edge region and a central region.

5. The apparatus recited in claim 1 wherein said touch sensitive screen enables one said first or second classification unit depending upon which of said first or second touch region is touched during a touch event.

6. The apparatus recited in claim 1 wherein said at least one sensor detects mechanical vibrations initiated by said touch event.

7. The apparatus recited in claim 1 wherein said at least one sensor comprises a sensor taken from the group of sensors consisting of impact sensors, vibration sensors, accelerometers, strain gauges, piezo-electric devices and acoustic sensors.

8. The apparatus recited in claim 1 wherein said distinguishing features are extracted based on at least one computation of a characteristic taken from the group consisting of average, standard deviation, variance, skewness, kurtosis, sum, root mean square, crest factor, dispersion, entropy, power sum, center of mass, coefficient of variation, cross-correlation, zero-crossings, seasonality, DC bias, spectral centroid, spectral density, spherical harmonics, spectral energy, band energy ratio, by spectral band ratios, cepstral coefficients and Fourier transform content.

9. A method of analyzing touch screen users based on characterization of features derived from a touch event, the method comprising:
   detecting a touch event on a touch sensitive screen, said touch sensitive screen having two touch regions;
   generating a vibro-acoustic waveform signal using at least one sensor detecting such touch event;
   converting the waveform signal into a domain signal;
   extracting distinguishing features from said domain signal; and
   classifying said features to analyze the features of the domain signal by employing one of two different classification processes depending on which of the two distinct touch regions was touched during the touch event, wherein a first classification process is employed based on the touch event being associated with a first touch region, and wherein a second classification process is employed based on the touch event being associated with a second touch region and not with the first touch region, wherein the first touch region is everywhere proximate to an edge of said touch sensitive screen, wherein the second touch region is all remaining area of said touch sensitive screen not including the first touch region, and wherein if any portion of the touch event is in the first touch region, the first classification process is configured to classify that event.

10. The method recited in claim 9 wherein said touch sensitive screen comprises an edge region and a central region.

11. The method recited in claim 9 wherein said touch sensitive screen enables one of two different said classification processes depending upon which of said two distinct touch regions is touched during the touch event.

12. The method recited in claim 9 wherein said at least one sensor detects mechanical vibrations initiated by said touch event.

13. The method recited in claim 9 wherein said at least one sensor comprises a sensor taken from the group of sensors consisting of impact sensors, vibration sensors, accelerometers, strain gauges, piezo-electric devices and acoustic sensors.

14. The method recited in claim 9 wherein said distinguishing features are extracted based on at least one computation of a characteristic taken from the group consisting of average, standard, deviation, variance, skewness, kurtosis, sum, root mean square, crest factor, dispersion, entropy, power sum, center of mass, coefficient variation, cross-correlation, zero-crossings, seasonality, DC bias, spectral centroid, spectral density, spherical harmonics, spectral energy, band energy ratio, log spectral band ratios, cepstral coefficients and fast Fourier transform content.

15. A non-transitory computer readable medium containing instructions for using detected touch screen events to analyze touch screen users where there are two touch screen regions, wherein execution of the instructions by a processor causes the processor to carry out the steps of:
   generating a vibro-acoustic waveform signal using at least one sensor detecting a touch event;
   converting the waveform signal into a domain signal;
   extracting distinguishing features from said domain signal; and
   classifying said features to analyze the features of the domain signal by employing one of two different classification processes depending on which of the two distinct touch regions was touched during the touch event, wherein a first classification process is employed based on the touch event being associated with a first touch region, and wherein a second classification process is employed based on the touch event being associated with a second touch region and not with the first touch region, wherein the first touch region is distinct from the second touch region, wherein the first touch region is everywhere proximate to an edge of said touch sensitive screen, wherein the second touch region is all remaining area of said touch sensitive screen not including the first touch region, and wherein if any portion of the touch event is in the first touch region, the first classification process is configured to classify that event.

* * * * *